United States Patent
Elayouty et al.

(10) Patent No.: US 8,949,526 B1
(45) Date of Patent: Feb. 3, 2015

(54) RESERVING STORAGE SPACE IN DATA STORAGE SYSTEMS

(75) Inventors: Mohamed Elayouty, Cary, NC (US); Russell Laporte, Webster, MA (US); Phillip H. Leef, Brookline, MA (US); Michael P. Gordon, Attleboro, MA (US); Ashok Ramakrishnan, Morrisville, NC (US)

(73) Assignee: EMC Corporation, Hopkinton, MA (US)

( * ) Notice: Subject to any disclaimer, the term of this patent is extended or adjusted under 35 U.S.C. 154(b) by 597 days.

(21) Appl. No.: 13/248,306

(22) Filed: Sep. 29, 2011

Related U.S. Application Data

(63) Continuation-in-part of application No. 12/966,415, filed on Dec. 13, 2010, now Pat. No. 8,700,832.

(51) Int. Cl.
*G06F 12/02* (2006.01)

(52) U.S. Cl.
USPC ..... 711/114; 711/154; 711/163; 711/E12.001

(58) Field of Classification Search
None
See application file for complete search history.

(56) References Cited

U.S. PATENT DOCUMENTS

| | | | |
|---|---|---|---|
| 8,510,265 B1 * | 8/2013 | Boone et al. | 709/222 |
| 2002/0029319 A1 * | 3/2002 | Robbins et al. | 711/114 |
| 2005/0021727 A1 * | 1/2005 | Matsunami et al. | 709/223 |
| 2005/0283575 A1 * | 12/2005 | Kobayashi et al. | 711/147 |
| 2007/0288693 A1 * | 12/2007 | Rajan et al. | 711/114 |
| 2011/0208922 A1 * | 8/2011 | Coronado et al. | 711/148 |

* cited by examiner

*Primary Examiner* — Michael Krofcheck
(74) *Attorney, Agent, or Firm* — Deepika Bhayana; Jason A. Reyes; Krishnendu Gupta

(57) ABSTRACT

A method is used in reserving storage space in data storage systems. A set of logical units (LUs) predefined as file based storage hardware specific LUs are reserved in a restricted access storage space of a block based storage system. The restricted access storage space is accessed by a file based storage system for storing information required for initializing the file based storage system. The file based storage system is initialized using the information stored in the file based storage hardware specific LUs.

14 Claims, 4 Drawing Sheets

RESERVING STORAGE SPACE IN DATA STORAGE SYSTEMS

CROSS REFERENCE TO OTHER APPLICATIONS

This application is a continuation-in-part of and claims priority to U.S. patent application Ser. No. 12/966,415 entitled AUTOMATED ADDITION OF FILE BASED HARDWARE AND FILE BASED ACCESS SERVICES IN A DATA STORAGE SYSTEM, filed on Dec. 13, 2010 and issued on Apr. 15, 2014 as U.S. Pat. No. 8,700,832, which is incorporated herein by reference for all purposes.

BACKGROUND

1. Technical Field

This application relates to reserving storage space in data storage systems.

2. Description of Related Art

Computer systems may include different resources used by one or more host processors. Resources and host processors in a computer system may be interconnected by one or more communication connections. These resources may include, for example, data storage devices such as file servers and those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

Large storage arrays today manage many disks that are not identical. Storage arrays use different types of disks, i.e., disks with different RAID levels, performance and cost characteristics. In the industry there have become defined several levels of RAID systems. RAID (Redundant Array of Independent or Inexpensive Disks) parity schemes may be utilized to provide error detection during the transfer and retrieval of data across a storage system. A RAID system is an array of multiple disk drives which appears as a single drive to a data storage system. A goal of a RAID system is to spread, or stripe, a piece of data uniformly across disks (typically in units called chunks), so that a large request can be served by multiple disks in parallel.

SUMMARY OF THE INVENTION

A method is used in reserving storage space in data storage systems. A set of logical units (LUs) predefined as file based storage hardware specific LUs are reserved in a restricted access storage space of a block based storage system. The restricted access storage space is accessed by a file based storage system for storing information required for initializing the file based storage system. The file based storage system is initialized using the information stored in the file based storage hardware specific LUs.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
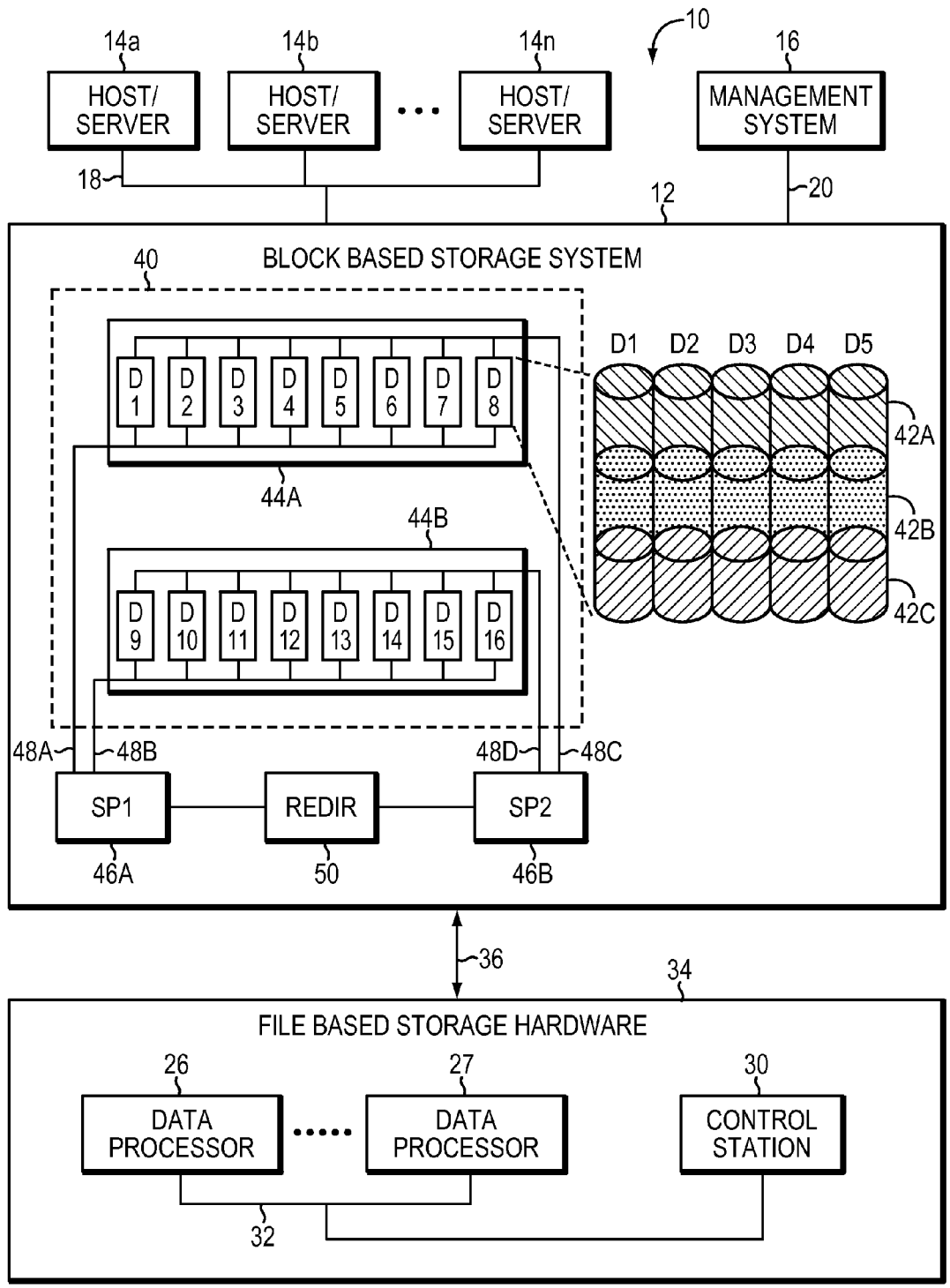
FIG. 1 is an example of an embodiment of a computer system that may utilize the techniques described herein.

Described below is a technique for use in reserving storage space in data storage systems, which technique may be used to provide, among other things, reserving a set of logical units (LUs) predefined as file based storage hardware specific LUs in a restricted access storage space of a block based storage system, and initializing a file based storage system using the information stored in the file based storage hardware specific LUs.

In certain cases, an enterprise can utilize different types of storage systems to form a complete data storage environment. In one arrangement, the enterprise can utilize both a block based storage system, such as a CLARiiON™ system (produced by EMC Corporation, Hopkinton, Mass.), and a file based storage hardware, such as a Celerra™ system (produced by EMC Corporation, Hopkinton, Mass.). In such an arrangement, typically the file based storage hardware operates as a front-end to the block based storage system such that the file based storage hardware and the block based storage system form a unified storage system.

In a case where an enterprise upgrades a block based storage system to include a file based storage system such as a file based storage hardware, upon connection to the block based storage system and following power-up, the file based storage hardware automatically detects attachment to the block based storage system and automatically installs file based storage hardware operation instructions without requiring intervention by an end user. File based storage hardware operation instructions are generally stored on a set of logical units (LUs) predefined as file based storage hardware specific LUs. The file based storage hardware specific LUs store information such as an operating system software and a database required for the operation of the file based storage system. The file based storage hardware specific LUs include six logical units, three of which include data path information critical to the operation of the file based storage system, one of which includes control path information and two or more are reserved for future use. For example, following connection to the block based storage system, the file based storage system receives from the block based storage system initial operation instructions, such as bootable bit images, for a portion of the file based storage hardware, such as a storage processor or data processor. The bootable bit image enables the data processor hardware to boot into an automated mode that allows a control station associated with the file based storage hardware to automatically complete a file based storage hardware installation process. For example, the control station is pre-configured with boot strap operating instructions that, when executed by the control station, cause the control station to detect the automated nature of the installation process and access the data processor over a private internal management network to execute the file based storage hardware installation process.

In a conventional system, in a case where an enterprise upgrades a block based storage system to include a file based storage system, disk space is manually allocated from user storage space on the block based storage system for configuring a set of logical units as file based storage hardware specific LUs. Further, in such a conventional system, the disk space for the file based storage hardware specific LUs allocated from the user storage space is accessible to any user (e.g., a storage administrator) of a block based storage system. As a result, in such a conventional system, the file based storage hardware specific LUs are accessible to users of the block based storage system. Thus, in such a conventional system, a user may mistakenly update a logical unit of the set of logical units that are predefined as the file based storage hardware specific LUs by performing a function such as an unbind operation on the logical unit, delete the logical unit, or remove the association of the logical unit to the file based storage system. Consequently, in such a conventional system, inadvertently performing such operations on the file based storage hardware specific LUs may cause data loss or data unavailability for users of a file based storage system. Additionally, in such a conventional case, the allocation of the file based storage hardware specific LUs from a storage space that is accessible to a user of a block based storage system may use a specific RAID technology employed by the user for the file based storage hardware specific LUs, which may not be aligned with the performance needs of users of file systems managed by a file based storage system.

By contrast, in at least some implementations in accordance with the current technique as described herein, reserving a storage space from a restricted access storage area of a block based storage system for configuring a set of logical units as file based storage hardware specific LUs provides restricted access to the file based storage hardware specific LUs. Therefore, the file based storage hardware specific LUs are not accessible by users (e.g., a storage administrator) of the block based storage system. In at least some implementations in accordance with the current technique, a restricted access storage area of a block based storage system includes an operating system and a data base required for initializing and execution of the block based storage system. Additionally, in at least some implementations in accordance with the current technique, reserving a set of logical units (LUs) predefined as file based storage hardware specific LUs in a restricted access storage space of a block based storage system enables a first subset of the file based storage hardware specific LUs that may include critical data path information to be configured using a three-way mirror RAID protection scheme and a second subset of the file based storage hardware specific LUs that may include control path information to be configured using a RAID-3 protection scheme that provides protection against a single vault drive failure. Moreover, in at least some implementations in accordance with the current technique, reserving the file based storage hardware specific LUs at a specific storage location that is known during a manufacturing process enables storing control path information such as an operating system software of the file based storage system on the file based storage hardware specific LUs by using a bit blasting process.

By contrast, in at least some implementations in accordance with the current technique as described herein, the use of the reserving storage space in data storage systems can provide one or more of the following advantages: reducing an amount of time of installation of a file based storage system or upgrade of a block based storage system to include a file based storage system by reserving a set of logical units (LUs) predefined as file based storage hardware specific LUs in a restricted access storage space of the block based storage system, predictable and deterministic installation process by eliminating the need to manually allocate a disk space on the block based storage system, and reducing or eliminating incidents of data loss and/or data unavailability by preventing a user of the block based storage system from accessing the file based storage hardware specific LUs.

Referring now to FIG. 1, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a CLARiiON™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a Celerra™ system produced by EMC Corporation of Hopkinton, Mass., configured as a header to the block based storage system 12.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the block based data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the block based data storage systems over an iSCSI or fibre channel connection and the management system may communicate with the block based data storage systems over a separate network connection using TCP/IP. It should be noted that although FIG. 1 illustrates communications between the hosts and block based data storage systems being over a first connection, and communications between the management system and the block based data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the block based data storage systems 12 to perform a data operation. For example, an application executing on one of the host computers 14a-14n may perform a read or write operation resulting in one or more data requests to the block based data storage systems 12.

The management system 16 may be used in connection with management of the block based data storage systems 12. The management system 16 may include hardware and/or software components. The management system 16 may include one or more computer processors connected to one or more I/O devices such as, for example, a display or other output device, and an input device such as, for example, a keyboard, mouse, and the like. A block based data storage system manager may, for example, view information about a current storage volume configuration on a display device of the management system 16. The manager may also configure a block based data storage system 12, for example, by using a management software to define a logical grouping of logically defined devices, referred to elsewhere herein as a storage group (SG), and restrict access to the logical group.

An embodiment of the block based data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). It should be noted that each of the data storage systems may operate stand-alone, or may also included as part of a storage area network (SAN) that includes, for example, other components such as other data storage systems, file based data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the block based data storage system 12 may also include other components than as described for purposes of illustrating the techniques herein.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 1, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (I/O) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 1, is for illustrative purposes only, and is not considered a limitation of the current technique described herein.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 1, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

In at least one embodiment of the current technique, the storage processor 46 is configured to define a set of LUs of the block based storage system 12 as file based storage hardware specific LUs. As indicated above, conventionally, when an enterprise adds a file based storage hardware to a block based storage system, a user such as a storage administrator then manually allocates disk space on the block based storage system specifically for use by the file based storage hardware. By contrast, in at least one embodiment of the current technique, the block based storage system 12 of FIG. 1 allocates a set of LUs from a restricted access storage space and reserves the set of LUs for use by file based storage hardware 34. For example, in the case where the block based storage system 12 is configured as a CLARiiON™ system, the storage processor 46 allocates a set of LUs and configures the set of LUs specifically for use by a Celerra™ system. The storage processor 46 performs such an allocation during an array initialization procedure and regardless of an actual connection being present between the block based storage system 12 and the file based storage hardware 34. The allocation of the set of LUs takes place in the anticipation that, at some later point in time, an enterprise will attach file based storage hardware 34 to the block based storage system 12. In the event that the enterprise does not attach file based storage hardware 34 to the block based storage system 12, the set of LUs configured as file based storage hardware specific LUs remain present within the restricted access storage space but are not accessible to another attached host device or a user of the block based storage system 12.

In at least one embodiment of the current technique, the file based storage hardware specific LUs are preconfigured with initial operation instructions used by a portion of the file based storage system 34, such as a data processor 26 during an initiation procedure. For example, a manufacturer configures the file based storage hardware specific LUs with bootable bit images that, when provided to the data processor 26, allows the data processor 26 to boot and begin operation.

In at least one embodiment of the current technique, with reference to FIG. 1, during an installation procedure, an end user electrically couples the control station 30 to the data processor 26 via a network connection 32 and electrically couples the data processors 26, 27 to a disk processor enclosure 40 via one or more cables 36. For example, the end user can connect a first cable between the data processor 26 and a fiber channel port of a first storage processor (SPA) 46A and a second cable between the data processor 26 and a fiber channel port of a second data processor (SPB) 46B. In the case where the block based storage system 12 is operational, and following powering on of the connected control station 30 and the data processor 26, the file based storage hardware 34 can detect electrical coupling with the block based storage system 12 in a variety of ways. For example, the data processor 26 can receive a connection message transmitted from the disk processor enclosure 40 where the connection message indicates the presence of an electrical communication coupling between the block based storage system 12 and the file based storage hardware 34. With such an association, the data processor 26 can identify disk space on the block based storage system 12 to be utilized by the file based storage hardware 34 and allow the file based storage hardware to establish a communication path with (i.e., access) the preconfigured LUs of the block based storage system 12. The above-described process of accessing preconfigured LUs by file based storage hardware 34 eliminates the need for an end user to boot the data processor from media, such as a DVD. Additionally, the process minimizes or eliminates the necessity of utilizing a system manufacturer's representative to upgrade the data storage system 10 which may reduce costs associated with the upgrade process for the enterprise.

Figure 2:
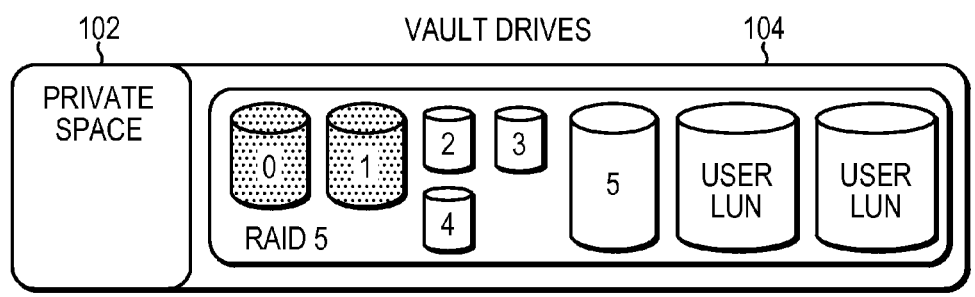
FIG. 2 is a representation of allocation of storage space for a set of logical units configured as file based storage hardware specific LUs in a conventional system.

Referring to FIG. 2, shown is a representation of allocation of storage space for a set of logical units configured as file based storage hardware specific LUs in a conventional system. Conventionally, when a user upgrades a block based storage system to include a file based storage system, a storage administrator allocates a set of logical units from a storage space 104 of the block based storage system by using a management interface. In such a conventional case, the storage administrator configures the set of logical units to store information such as an operating system and data base that is required for operating the file based storage system. Further, in such a conventional case, the storage administrator can not access and/or view information stored in private storage space 102 of the block based storage system. Thus, in such a conventional case, the storage administrator allocates storage space for the file based storage system from a user space 104 which is accessible by any user of the block based storage system. Consequently, in such a conventional system, a user may accidentally perform an update operation on the set of logical units reserved for the operation of the file based storage system causing unavailability of data for users of the file based storage system.

Figure 3:
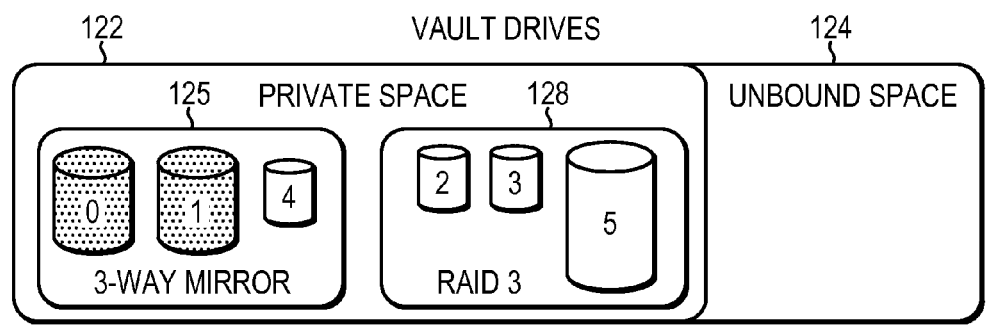
FIG. 3 is a more detailed representation of components that may be included in an embodiment using the techniques described herein.

Referring to FIG. 3, shown is a more detailed representation of components that may be included in an embodiment using the techniques described herein. With reference also to FIG. 1, in at least one embodiment of the current technique, a storage space is reserved in a restricted access private space 122 of a block based storage system 12 in such a way that the storage space is configured to store a set of logical units 125, 128 that are used for initialization and operation of a file based storage system when the block based storage system is upgraded to include the file based storage system. Thus, pre-allocating a storage space on the block based storage system 12 enables the file based storage system 34 to initialize and operate regardless of availability of physical disk storage space in user area 124 of the block based storage system 12 when the file based storage system is connected to the block based storage system. In at least one embodiment of the current technique, the set of logical units 125, 128 includes six logical units configured as file based storage hardware specific LUs that are available for use by file based storage system 34 when the file based storage system 34 is connected to block based storage system 12.

In at least one embodiment of the current technique, each of the file based storage hardware specific LUs are assigned a logical number (e.g., 0 to 5). Two of the file based storage hardware specific LUs (e.g. logical unit 0, logical unit 1) includes information associated with booting a data processor of the file based storage hardware 34. The file based storage hardware specific LUs 125 numbered as 0, 1 and 4 includes critical information and are associated to a RAID-1 group that is comprised of three disk drives. Hence, these logical units 125 can sustain a double-drive failure in such a way that the logical units 125 may still be available when two out of three disk drives fails. The remaining file based storage hardware specific LUs 128 numbered as 2, 3 and 5 are associated to a RAID-3 group that is comprised of four disk drives and can only sustain a single drive failure. Further, the six logical units 125, 128 configured as file based storage hardware specific LUs may be of size 92 gigabytes (GB) in total. The file based storage hardware specific LUs numbered as 0, 1, 2 and 3 includes information associated with a data path and logical units numbered as 4 and 5 includes information associated with a control path. The file based storage hardware specific LUs numbered as 0 may be of size 11 gigabytes (GB) and includes information such as a boot image, a root file system, a dump area, and logs for file based storage hardware 34. The file based storage hardware specific LUs numbered as 1 may be of size 11 gigabytes (GB) and includes information such as a file system log and a root file system. The file based storage hardware specific LUs numbered as 2 and 3 may each be of size 2 gigabytes (GB) and are reserved for a future use. The file based storage hardware specific LUs numbered as 4 may be of size 2 gigabytes (GB) and include information such as a database used by control station 30 and configuration information. The file based storage hardware specific LUs numbered as 5 may either be of size 32 gigabytes (GB) or 64 gigabytes (GB), and include information such as logs for control station 30, core dumps and archived logs.

In at least one embodiment of the current technique, a component ("automatic private logical unit") of the block based storage system 12 creates two sets of logical units 125, 128 in a private storage space 122 (also referred to herein as "restricted access storage space") of the block based storage system 12. File based storage hardware 34 uses the two sets of logical units 125, 128 created in the private storage space of the block based storage system 12 as file based storage hardware specific LUs. Further, in at least one embodiment of the current technique, the two sets of logical units may be organized as two different RAID configurations. The first set of the logical units is referred to as persistent storage manager (PSM) LUs 125 and the second set of the logical units is referred to as vault LUs 128. The PSM LUs 125 includes information related to configuration of the block based storage system 12. The vault LUs 128 includes write-cache data and uses the write-cache data when a storage processor of the block based storage system 12 fails to perform I/O operations. The PSM LUs 125 may be configured as a RAID-1 group that provides a "N+2" protection in a 3-drive configuration such that a set of three disk drives may be associated with the PSM LUs 125. Thus, the RAID-1 group may be utilized for critical devices (e.g., boot and configuration logical units) of file based storage system 34. The vault LUs 128 may be configured as a RAID-3 group such that a set of four disk drives may be associated with the vault logical unit.

The automatic private logical unit component automatically creates and binds the six logical units configured as the file based storage hardware specific LUs during an initialization process of the block based storage system 12, which occurs when an image (e.g. an operating system software) is installed or upgraded on a storage processor of block based storage system 12. When the image is loaded on the storage processor, the automatic private logical unit component determines whether the file based storage hardware specific LUs have been created in a private storage space, and initiates a bind request for the file based storage hardware specific LUs. The file based storage hardware specific LUs are not accessible or visible to a user (such as a storage administrator) of block based storage system 12 via a graphical or command line user interface of a management system of the block based storage system 12. However, the file based storage hardware specific LUs are accessible to the file based storage hardware 34 such that data processor 26 may boot file based storage hardware 34 when file based storage hardware 34 is added to the block based storage system 12. Thus, an installation process of file based storage hardware 34 uses information stored on the file based storage hardware specific LUs that are created in the private storage space of the block based storage system 12 for initializing the file based storage hardware 34. Therefore, no logical units are created during installation of the file based storage hardware 34 because a pre-defined set of logical units are allocated and configured as file based storage hardware specific LUs. Further, each of the file based storage hardware specific LUs is assigned a host logical unit (referred to as "HLU") number during initialization of the block based storage system 12 such that the host logical unit number does not change at a later time. Further, the block based storage system 12 reserves a storage space for file based storage hardware specific LUs, regardless of whether the block based storage system 12 is configured to include a file based storage system 34 at a later time. Further, the block based storage system 12 creates and binds the file based storage hardware specific LUs. In at least one embodiment of the current technique, file based storage hardware specific LUs may be configured to include a boot image when the block based storage system 12 creates and configures the file based storage hardware specific LUs. In an alternate embodiment of the current technique, file based storage hardware 34 may upload a boot image on the file based storage hardware specific LUs when the file based storage hardware 34 initiates an installation process.

Figure 4:
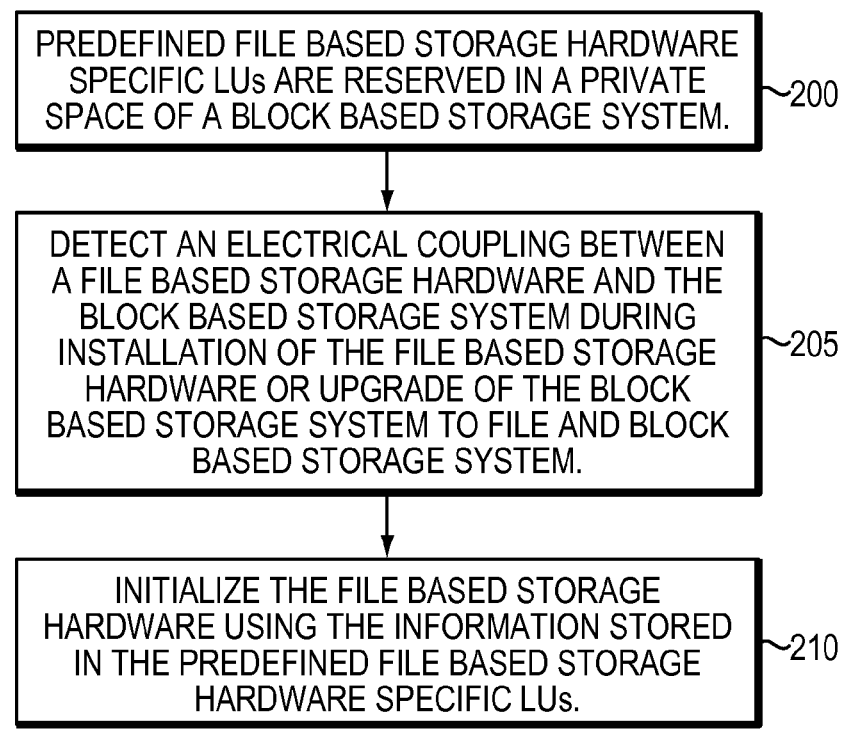
FIG. 4 is a flow diagram illustrating processes that may be used in connection with techniques herein.

Referring to FIG. 4, shown is a flow diagram illustrating a flow of data in the data storage system. With reference also to FIGS. 1 and 3, a set of logical units are preconfigured as file based storage hardware specific LUs in a private storage space of block based storage system 12 (step 200). Block based storage system 12 detects an electrical coupling between a file based storage hardware 34 and block based storage system when block based storage system 12 is upgraded or installed to include the file based storage hardware 34 (step 205). File based storage hardware 34 is initialized by using the file based storage hardware specific LUs (step 210). File based storage hardware 34 may use information stored in the file based storage hardware specific LUs for initializing and booting the file based storage hardware 34. Alternatively, file based storage hardware 34 may store information in the file based storage hardware specific LUs during initialization of file based storage hardware 34 for booting data processors of file based storage hardware 34.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:
1. A method for use in reserving storage space in data storage systems, the method comprising:
reserving a set of logical units (LUs) predefined as file based storage hardware specific LUs in a restricted access storage space of a block based storage system, wherein the file based storage hardware specific LUs are inaccessible by a user of the block based storage system, wherein a first subset of the file based storage hardware specific LUs is configured using a first Redundant Array of Independent or Inexpensive Disks (RAID) scheme and a second subset of the file based storage hardware specific LUs is configured using a second RAID scheme, wherein the restricted access storage space is accessed by a file based storage system upon addition of the file based storage system to the block based storage system, wherein the file based storage hardware specific LUs stores information required for initializing the file based storage system; and
initializing the file based storage system using the information stored in the file based storage hardware specific LUs.

2. The method of claim 1, wherein the set of logical units predefined as the file based storage hardware specific LUs includes at least three logical units storing data path information critical to operation of the file based storage system, at least one logical unit storing control path information and at least two logical units reserved for future use.

3. The method of claim 2, wherein the at least three logical units are organized based on the first RAID scheme, wherein the at least two logical units are organized based on the second RAID scheme.

4. The method of claim 1, wherein the information stored on the file based storage hardware specific LUs includes file based storage hardware operation instructions.

5. The method of claim 1, wherein the restricted access storage space is not accessible by a user of the block based storage system.

6. The method of claim 1, further comprising:
detecting, by the file based storage system, an electrical coupling between the file based storage system and the block based storage system; and
receiving, following detection of the electrical coupling between the file based storage system and the block based storage system, by a data mover of the file based storage system, initial operation instructions from the file based storage hardware specific LUs, the block based storage system having the initial operation instructions pre-imaged on the file based storage hardware specific LUs.

7. The method of claim 1, wherein establishing, by the file based storage system, a communication path with the block based storage system comprises automatically executing, by a control station of the file based storage system, an installation procedure to establish the communication path for communication with the block based storage system.

8. A system for use in reserving storage space in data storage systems, the system comprising a processor configured to:
reserve a set of logical units (LUs) predefined as file based storage hardware specific LUs in a restricted access storage space of a block based storage system, wherein the file based storage hardware specific LUs are inaccessible by a user of the block based storage system, wherein a first subset of the file based storage hardware specific LUs is configured using a first Redundant Array of Independent or Inexpensive Disks (RAID) scheme and a second subset of the file based storage hardware specific LUs is configured using a second RAID scheme, wherein the restricted access storage space is accessed by a file based storage system upon addition of the file based storage system to the block based storage system, wherein the file based storage hardware specific LUs stores information required for initializing the file based storage system; and initialize the file based storage system using the information stored in the file based storage hardware specific LUs.

9. The system of claim 8, wherein the set of logical units predefined as the file based storage hardware specific LUs includes at least three logical units storing data path information critical to operation of the file based storage system, at least one logical unit storing control path information and at least two logical units reserved for future use.

10. The system of claim 9, wherein the at least three logical units are organized based on the first RAID scheme, wherein the at least two logical units are organized based on the second RAID scheme.

11. The system of claim 8, wherein the information stored on the file based storage hardware specific LUs includes file based storage hardware operation instructions.

12. The system of claim 8, wherein the restricted access storage space is not accessible by a user of the block based storage system.

13. The system of claim 8, further comprising:
detect, by the file based storage system, an electrical coupling between the file based storage system and the block based storage system; and
receive, following detection of the electrical coupling between the file based storage system and the block based storage system, by a data mover of the file based storage system, initial operation instructions from the file based storage hardware specific LUs, the block based storage system having the initial operation instructions pre-imaged on the file based storage hardware specific LUs.

14. The system of claim 8, wherein establishing, by the file based storage system, a communication path with the block based storage system comprises automatically executing, by a control station of the file based storage system, an installation procedure to establish the communication path for communication with the block based storage system.

* * * * *